June 1, 1948. E. A. WHITE 2,442,521
MACHINE FOR CONVEYING AND ASSORTING FRUIT ACCORDING TO WEIGHT
Filed May 4, 1946 3 Sheets-Sheet 1

INVENTOR.
Edward A. White
BY
ATTORNEY

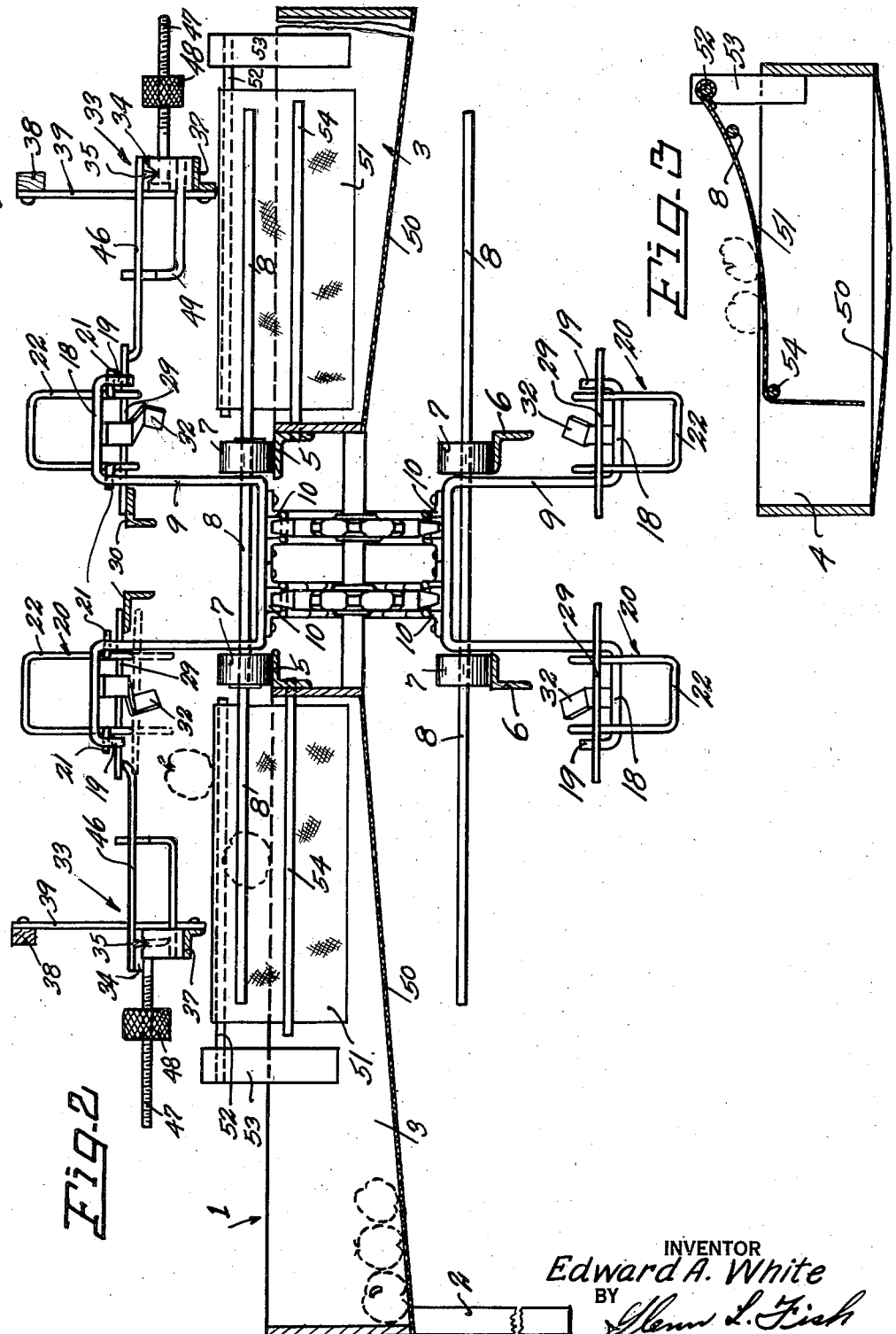

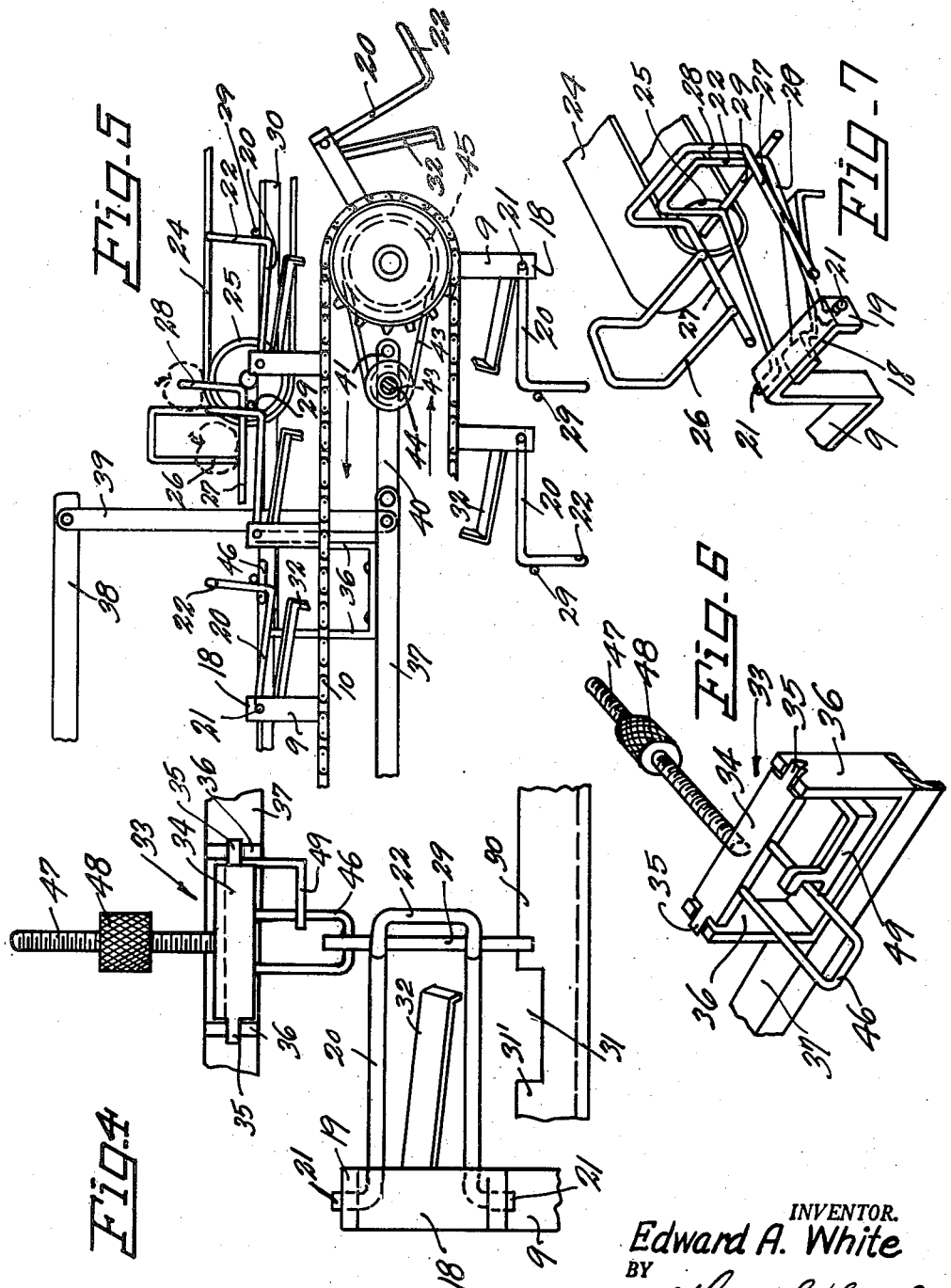

Patented June 1, 1948

2,442,521

UNITED STATES PATENT OFFICE 2,442,521

MACHINE FOR CONVEYING AND ASSORTING FRUIT ACCORDING TO WEIGHT

Edward A. White, Lewiston, Idaho

Application May 4, 1946, Serial No. 667,377

6 Claims. (Cl. 209—121)

This invention relates to a fruit assorting machine and it is one of the objects of the invention to provide a machine which will distribute fruit according to weight to various bins from which the fruit is then removed by operators and packed into containers for shipment.

Another object of the invention is to provide a sorting machine of such construction that the fruit may be first dumped upon a table at the front end of the machine and spotted or otherwise defective fruit removed by an operator, the good fruit being then delivered to endless conveyors which move the fruit through the machine longitudinally thereof into position over bins where improved weighing mechanism is provided for selectively discharging large and small fruit from the conveyors into bins provided to receive the same.

Another object of the invention is to provide a sorting machine wherein the discharge of fruit is performed according to the weight of the fruit, improved scales being provided for individually weighing the fruit and first allowing large fruits to be discharged into a bin and then allowing fruit of lighter weight to be discharged into another bin.

Another object of the invention is to provide a sorting machine having its weighing scales so constructed that they may be individually set to effect discharge of fruit of predetermined weight into bins over which the conveyors move, fruit of less weight than a predetermined minimum weight remaining upon the conveyors until they reach the rear end of the machine where they are dumped from the conveyors as culls which are too small for packing but may be used for obtaining fruit juices and for manufacture of other by products.

Another object of the invention is to provide a fruit conveying and sorting machine which is comparatively simple in construction, very efficient in operation, and not liable to get out of order and need repairs.

Another object of the invention is to provide aprons in the bins for catching fruit discharged from the conveyors and depositing the same in the bins without the fruit becoming bruised.

Another object of the invention is to provide a fruit sizer which is very efficient in operation and not liable to get out of order.

The invention is illustrated in the accompanying drawings wherein:

Fig. 2 is a transverse sectional view taken along line 2—2 of Figure 1.

Fig. 3 is a sectional view through a bin showing the apron for catching fruit and preventing bruising of the same.

Fig. 4 is a fragmentary view showing scales and a portion of a conveyor in top plan.

Fig. 5 is a fragmentary sectional view taken longitudinally of the sizing machine through one end portion thereof.

Fig. 6 is a perspective view of a scale.

Fig. 7 is a fragmentary perspective view of a portion of a conveyor and a belt for delivering fruit to the conveyor.

Figure 1:
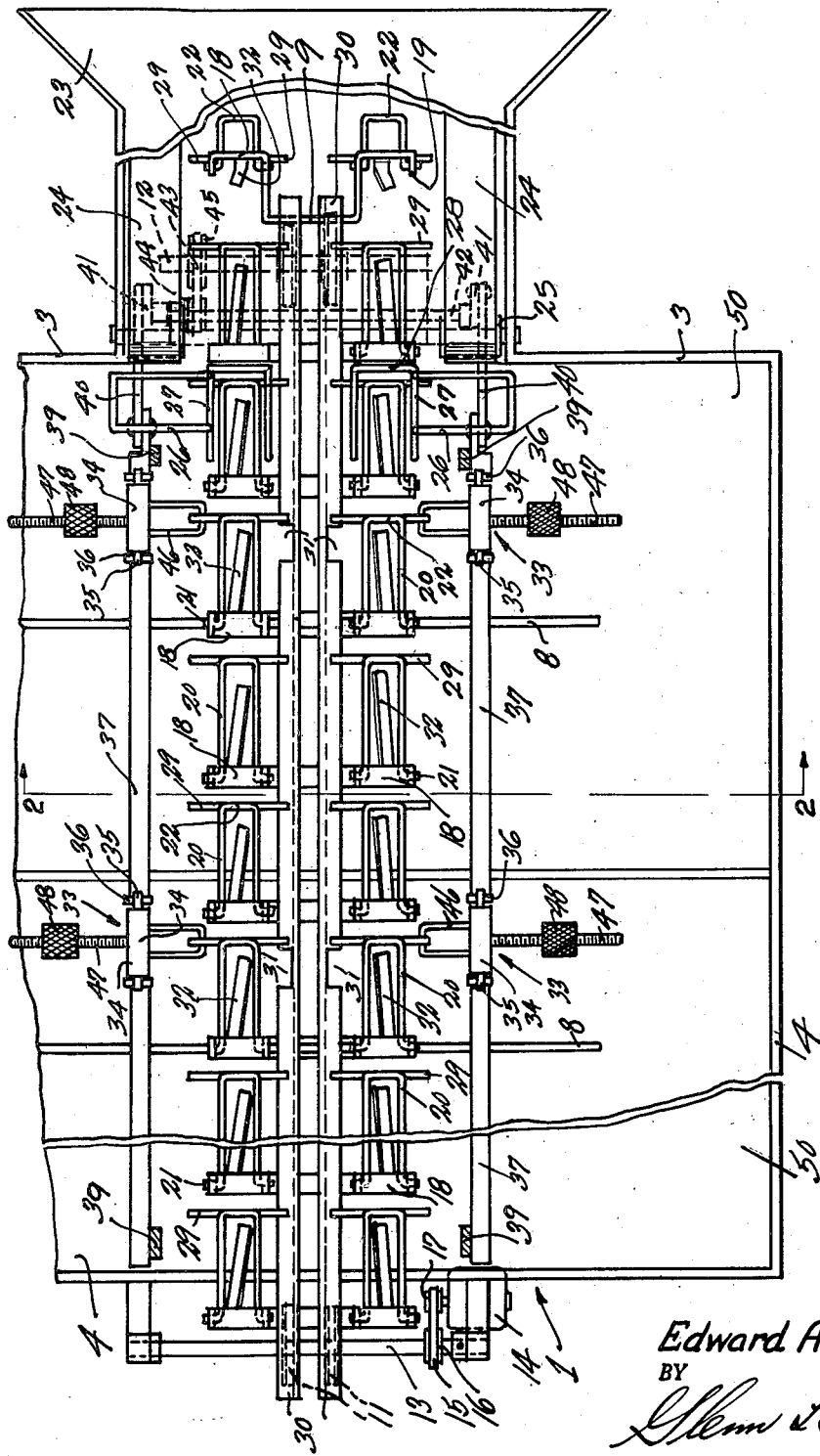
Fig. 1 is a top plan view of the improved fruit sizing machine.

This improved fruit sizing machine has a body 1 supported upon a suitable number of legs 2 and formed into side bins 3 and 4. Referring to Figures 1 and 2 it will be seen that bins are provided at opposite sides of the longitudinal center of the machine, each side of the machine having a front bin 3 for receiving large fruit and a rear bin 4 for receiving smaller fruit. It will be understood that the machine may be provided with a greater number of bins at each side for receiving large fruit and small fruit and fruit of intermediate sizes. The bins at one side of the machine are spaced from those at the other side thereof and along inner end walls of the bins are mounted angle bars 5 constituting upper tracks while below these upper tracks are lower tracks 6. The tracks 5 and 6 extend the full length of the frame or body portion of the separator and are engaged by rollers 7 carried by rods 8 which are mounted through yokes 9 which are secured to links of chains 10 trained about sprocket wheels 11 carried by shafts 12 and 13 constitutes the main drive shafts of the machine and power is applied to this drive shaft from an electric motor 14 by a belt 15 trained about pulleys 16 and 17 carried by the shaft 13 and the shaft of the motor.

The yokes 9 are formed from strips of stiff metal bent to form so that each yoke is U-shaped, as shown in Figure 2, and has its arms bent laterally to provide extensions 18 having tongues 19 at their outer ends. U-shaped fruit carriers 20 are pivotally carried by the extensions 18 of the yokes 9 and these carriers which are formed of bent metal have their arms bent to form pintles 21 engaged in openings formed through the tongues and the arms of the yokes, bridge portions of the carriers being bent perpendicularly of their arms to form stops 22 which prevent fruit from accidentally rolling off of the carriers as the fruit is moved rearwardly of the machine. The fruit is fed to the machine by operators who stand in front of a sorting table 23 at the front end of the machine and, after removing culled fruit, place the good fruit upon conveyor belts 24. These belts are located near opposite sides of the sorting table and have their forward portions trained about pulleys 25. Any suitable means may be provided for turning the pulleys and driving the conveyor belts 24. Upon reaching front ends of the conveyors 24 the fruit will be deposited upon frames 26 formed from metal strands bent to a U-shape. These frames have their arms welded to the arms of U-shaped supporting frames 27 and when apples or other fruit are deposited upon the frames 26 they roll onto the frames 27 and come to rest against the upstanding bridge portions 28 of the frame 27. The supporting frames 27 are wider than the carriers 20 and as the carriers move upwardly about the front sprocket wheels their bridge portions move upwardly and forwardly between arms of the supporting frames and carry the fruit towards the rear end of the machine. Rods 29 are mounted transversely of the carriers with their end portions projecting from inner and outer sides thereof and since the inner end portions of these rods will rest upon bars 30 extending longitudinally of the machine the carriers will be supported in a horizontal position and the fruit will be carried towards the rear end of the machine without being accidentally dislodged from the carriers. Openings or recesses 31 are formed in horizontal flanges of the angle bars 30 midway the width of each bin so that at desired points within the length of the bars the carriers may tilt downwardly, the rods passing through the recesses, and dislodging horns 32 carried by the extensions 18 of the yokes exert upward thrust to dislodge fruit from the carriers and cause the fruit to drop into the bins.

In order to accomplish this there have been provided scales 33. These scales are of duplicate construction and each has a rocker bar 34 formed with pintles 35 which rest in notches formed at upper ends of posts 36 which extend upwardly from bars 37. These bars 37 extend longitudinally of the machine and are suspended from overhead supporting bars 38 by hangers 39 and since the hangers are pivoted to the bars 37 and 38 the bars 37 will be floating bars and may have reciprocating motion longitudinally of the machine. Reciprocating motion is imparted to the bars 37 by links or pitman bars 40 which have their rear ends pivoted to front ends of the bars 37 and their front ends pivoted to cranks 41 formed at ends of a shaft 42. The shaft 42 is rotatably mounted transversely of the forward portion of the machine and rotary motion is transmitted to it by a belt 43 trained about pulleys 44 and 45 carried by the shaft 42 and the shaft 12. Since the shaft 42 is driven from the front shaft 12 of the conveyor mechanism the bars 37 will be reciprocated in timed relation to movement of the chains 10 and the carriers 20. U-shaped supporting arms 46 project inwardly of the bars 37 from the rocker bars 34 of the scales and reciprocating movement of the bars 37 is such that as the carriers approach the recesses or opening 31 outer ends of the rods 29 will rest upon the bridges of the arms 46 where they will be supported as the bars 37 move rearwardly.

During this movement should the fruit be of sufficient weight to force the arm 46 downward causing the short inner end of rod 29 to pass through the opening 31, the fruit will be discharged into a bin, but in case the fruit does not tip the scale, the rod 29 is deposited across the opening at 31' and travels to the next scale where a similar performance takes place. This movement is repeated until the fruit is deposited into a bin. The travel of the scale is regulated so that it travels one-half the length of the fruit carrier 20, supporting the carrier while it travels across the opening 31, either above or below the angle bar 30. After the scale has traveled its full stroke rearward, it returns to support the next carrier past the opening 31. A threaded shaft 47 extends outwardly from the rocker bar 34 of each scale and carries a threaded weight 48 which is shifted along the rod by turning it and thus moved to a position in which the weight will balance an apple or other fruit of a predetermined weight. Therefore the scales over the bin 3 are balanced to take care of the largest fruit and scales over the other bins will be graduated to handle lighter fruit as it progresses to the rear of the machine. It being understood that there are as many as fifteen or more bins on each side. As the fruit progresses along the machine in their individual carriers 20, it will not be discharged until it contacts the scale set to receive fruit of that particular weight. Hooks 49 carried by the forward posts 36 of the scales engage over side portions of arms 46 and prevent the arms 46 from being tilted upwardly beyond the horizontal position by the weights.

When the fruit is dislodged from the carriers and dropped into the bins it is desired to prevent the fruit from being bruised. These bins have canvas bottoms 50 and each has its inner end portion shielded by a canvas strip or sheet 51 mounted upon a rod 52 carried by a post 53 which projects upwardly from the front wall of the bin. The posts are spaced from inner or upper ends of the bins and the aprons 51 extend rearwardly from the rods and are draped across rods 54 carried by the inner end walls of the bins and spaced downwardly from upper edges thereof so that as the carriers 20 move towards the rear end of the machine and the apples are dropped into the bins and land upon the aprons the rods 8 carried by the yokes 9 may engage under the aprons in front of the fruit and gradually lift the aprons, and cause the fruit to be moved rearwardly over and beyond the rods 54 to a position in which the fruit drops a short distance into the bins. This will prevent the fruit from being bruised by direct drop from the carriers into the bins. The apples are removed from the bin for packing.

Having thus described the invention, what is claimed is:

1. A fruit sizing machine comprising sets of bins spaced from each other transversely of the machine, shafts rotatably mounted adjacent front and rear ends of the machine, sprocket wheels carried by said shafts, chains extending longitudinally of the machine intermediate the sets of bins and trained about the sprocket wheels, means for rotating the rear shaft whereby the rear shaft acts as a drive shaft and the front shaft as a driven shaft, tracks mounted along inner sides of the sets of bins, U-shaped yokes carried by the chains transversely thereof and having their arms bent to form outwardly projecting extensions terminating in bent ends forming tongues, U-shaped carriers having arms bent at their ends to form pintles engaged through openings in the arms and tongues of the yokes to pivotally mount the carriers, bridge portions of the carriers being bent to form abutments for holding fruit upon the carriers, a sorting table at the front of the machine, U-shaped holders over front end portions of said chains and through which the carriers pass to remove fruit as the chains move longitudinally, U-shaped feeders extending transversely from said holders, conveyors extending longitudinally of the table in position for delivering fruit to the feeders for movement along the feeders and onto the holders, bars extending longitudinally of the machine above the tracks and formed with recesses over the front and rear bins, rods mounted transversely of said carriers with ends projecting from inner and outer sides thereof, inner end portions of the rods resting upon said bars to support the carriers in a horizontal position and being movable downwardly through the recesses, strips carried by the extensions of the bridges for engaging fruit and dislodging the same from the carriers when the carriers tilt downwardly as the rods pass through the recesses, reciprocating bars extending longitudinally of the machine and suspended from overhead supports by vertical links pivoted to the supports and the reciprocating bars, a crank shaft rotated from the front shaft, pitman bars pivoted to the reciprocating bars and cranks of the crank shaft and reciprocating the bars in timed relation to movement of the sprocket chains, and weighing scales carried by said reciprocating bars over the bins and each consisting of a mounting having upstanding posts, a rocker bar pivotally mounted between the posts a supporting arm projecting from the rocker bar for engagement by outer end portions of the rods and supporting the carriers horizontal during movement of the rods over forward portions of the recesses, rearward movement of the reciprocating bars moving the supporting arms from under rods, a threaded shaft extending outwardly from the rocker bar, a weight threaded upon the threaded shaft for adjustment along the same to positions for preventing downward tilting of the carriers by fruit of less than a predetermined minimum weight, and a hook carried by one arm of the mounting and engaged over the arm for limiting upward movement of the arm.

2. A fruit sizing machine comprising a body including sets of bins spaced from each other transversely of the body and each including a front bin and a rear bin, tracks extending longitudinally of the body along inner sides of the sets of bins, shafts rotatably mounted across front and rear ends of the body and one constituting a drive shaft and the other a driven shaft, sprocket wheels carried by said shafts, conveyor chains trained about the sprocket wheels and extending longitudinally of the body, yokes carried by said chains and provided with arms having outstanding extensions, rods passing through the yokes and carrying wheels for resting upon the tracks, rails extending longitudinally of the body above the tracks, carriers pivoted to the extensions and provided with transverse supporting rods for resting upon the rails and preventing downward tilting of the carriers, the rails being formed with openings over the bins for allowing downward movement of the supporting rods and tilting of the carriers to a discharging position, members carried by the yokes for dislodging fruit from the carriers during downward tilting of the carriers, a table at the front of the body, conveyors extending longitudinally of the table, holders over forward portions of the conveyor chains having laterally extending feeders for receiving fruit from the conveyors and delivering the fruit to the holders, the carriers moving upwardly through the holders and removing fruit therefrom during movement of the chains, floating bars mounted for reciprocating movement longitudinally of the body over the bins, means actuated from the driven shaft for reciprocating the floating bars in timed relation to movement of the chains and the carriers longitudinally of the body, and weighing scales carried by the floating bars opposite the openings in the rails for engaging under the supporting rods of the carriers and holding the carriers in horizontal position during movement of the floating bars rearwardly of the body, the weighing scales moving from under the supporting rods during forward movement of the floating bars.

3. A fruit sizing machine comprising a body including transversely spaced sets of front and rear bins, an endless conveyor between the sets of bins extending longitudinally of the body and having upper and lower flights, yokes carried by the conveyor and having outstanding side extensions for overhanging the bins, carriers pivoted to the side extensions for vertical tilting movement and having rods projecting from their opposite sides, a sorting table at the front end of the body, feeders over said table, holders disposed over front end of the conveyor in position for passage of the carriers through the holders to remove fruit therefrom, said holders having members for receiving fruit from the feeders and delivering the same to the holders, rails for engagement under inner end portions of the rods to support the carriers in a horizontal position as they move longitudinally of the body over the bins, said rails being formed with openings for allowing downward tilting of the carriers, dislodging members carried by the side extensions of the yokes for dislodging fruit from the carriers into the bins when the carriers tilt downwardly at the openings, bars mounted for reciprocating movement longitudinally of the body and reciprocated in timed relation to movement of the conveyor and the carriers, and weighing scales carried by the bars for engaging under outer ends of the rods and supporting the carriers horizontal while the carriers move rearwardly of the body partially across the openings in the rails, the weighing scales then moving forwardly with the bars and out of supporting engagement with the rods to release the carriers.

4. A fruit sizing machine comprising a body including front and rear bins, a conveyor extending longitudinally of the body and provided with carriers pivotally mounted for vertical tilting movement from a raised position to a discharging position, members associated with the carriers for dislodging fruit therefrom when in the discharging position, a rail extending longitudinally of the body and formed with openings through which portions of the carriers pass during downward tilting of the carriers, means for delivering fruit to the carriers, a support mounted for reciprocating movement longitudinally of the body, means for reciprocating the support in timed relation to movement of the conveyor and travel of the carriers over the openings of the rails, and weighing scales carried by said support for engaging under the carriers and supporting the carriers during movement across the openings, the support then moving in an opposite direction to release the carriers.

5. A fruit sizing machine comprising a body including front and rear bins, a conveyor extending longitudinally of the body and provided with carriers pivotally mounted for vertical tilting movement from a raised position to a discharging position, members associated with the carriers for dislodging fruit therefrom when in the discharging position, a rail extending longitudinally of the body and formed with openings through which portions of the carriers pass during downward tilting of the carriers, means for delivering fruit to the carriers, a longitudinally reciprocable support having movement in timed relation to movement of the carriers over the openings in the rails, and weighing scales carried by said support for engaging under the carriers to support the same during movement of the carriers across the openings and then release the carriers for tilting movement to a discharging position, said weighing scales being settable for downward tilting of the carriers while over the openings by fruit of predetermined weight.

6. A fruit sorter comprising a body having a series of bins mounted on the sides thereof, a conveyor extending longitudinally of the body and provided with carriers pivotally mounted thereon for vertical tilting movement from a raised position to a discharging position, bars for supporting the carriers while moving rearwardly there being openings in the said bars for downward tilting of the carriers to a discharging position, weighing scales mounted on floating members traveling in timed relation to the carriers and supporting the said carriers in unison across the said openings, the weighing scales being individually adjusted whereby carriers bearing fruit of a predetermined weight will be tilted to a discharging position over its selected bin, aprons having ends secured to members carried by the bins and having their other ends free, said aprons extending longitudinally of the conveyors and supported upon stationary rods extending under the aprons transversely thereof, and rods carried by and extending from sides of the conveyor for engaging under the aprons and moving longitudinally thereof to lift the aprons and cause fruit resting thereon to be dropped from the aprons into the bins without bruising the fruit.

EDWARD A. WHITE.

REFERENCES CITED

The following references are of record in the file of this patent:

UNITED STATES PATENTS

| Number | Name | Date |
|---|---|---|
| 1,184,697 | Cutler | May 23, 1916 |
| 1,496,376 | Poore | June 3, 1924 |
| 1,633,002 | Cutler | June 21, 1927 |
| 1,710,199 | White | Apr. 23, 1929 |
| 2,093,338 | Niederer | Sept. 14, 1937 |